June 18, 1940. F. H. HAGNER 2,205,357
VISIBLE COURSE AND POSITION INDICATOR
Filed June 25, 1937 2 Sheets-Sheet 1
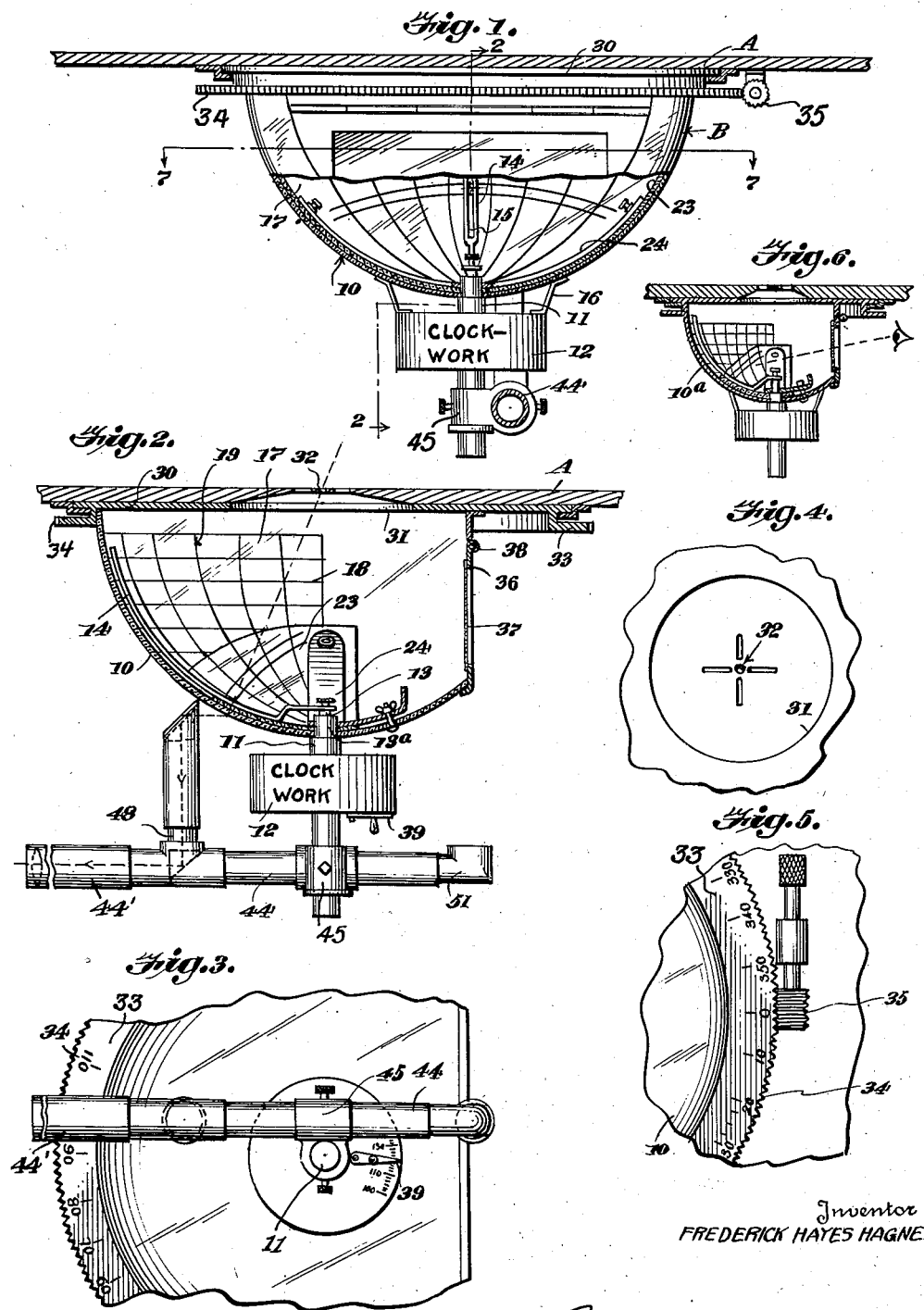
Inventor
FREDERICK HAYES HAGNER June 18, 1940. F. H. HAGNER 2,205,357
VISIBLE COURSE AND POSITION INDICATOR
Filed June 25, 1937 2 Sheets-Sheet 2
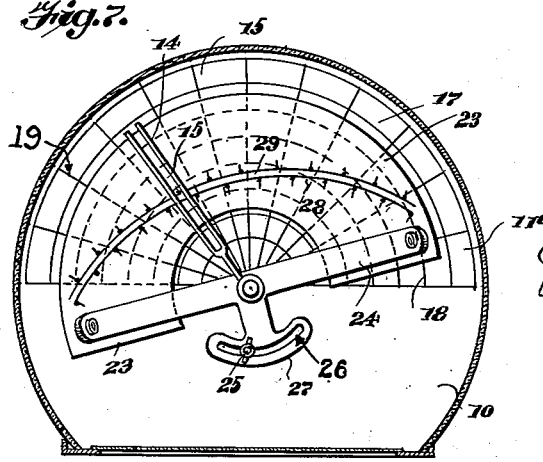
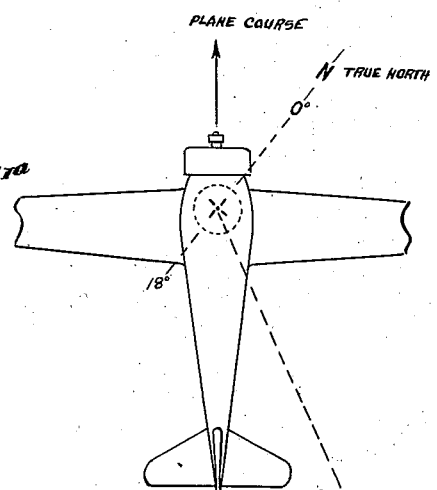
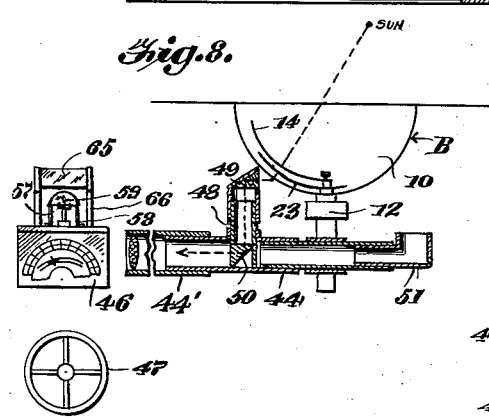
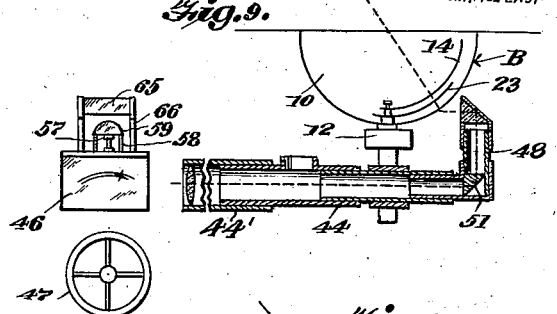
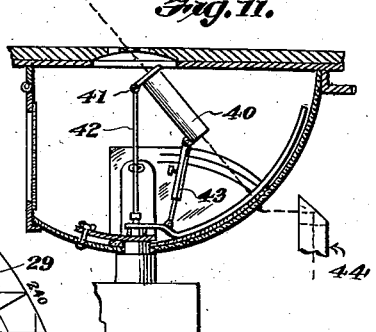
Inventor
FREDERICK HAYES HAGNER
By Irving L. McCathran
Attorney

UNITED STATES PATENT OFFICE 2,205,357

VISIBLE COURSE AND POSITION INDICATOR

Frederick Hayes Hagner, San Antonio, Tex., assignor, by direct and mesne assignments, to Archbold-Hagner Instrument Laboratory, Inc., a corporation of Delaware Application June 25, 1937, Serial No. 150,411

11 Claims. (Cl. 33—61)

This invention relates to a visible course and position indicator and has for one of its objects the production of an instrument or means whereby a pilot or navigator may easily follow with his eye a pre-computed great circle course of travel between a place of departure and a given destination, means being provided for observing a ray of light cast from a selected celestial body upon a pre-computed great circle course.

Another object of this invention is the provision of means whereby a pilot may always know the azimuth altitude and local hour angle of a selected celestial body with respect to his own position over a given location on the earth and compass heading, as well as the angular position of a plane in flight which he may be flying, with respect to the vertical and horizontal plane and with respect to a pre-computed great circle course of travel between a point of departure and a point of destination.

A further object of this invention is the provision of means for determining and checking the error, if any, in the path of travel along a predetermined course as well as the angle of tilt of the plane which the pilot may be flying, or the angle of tilt of the instrument at a selected time of observation of a ray of light cast from a selected celestial body upon a pre-computed great circle course of travel between a point of departure and a point of destination.

A still further object of this invention is the provision of means whereby a ray of light cast from a selected celestial body is used as a travelling indicator upon a pre-computed great circle course of travel between a point of departure and a point of destination and observed by a pilot of a ship, airplane, or other means of transportation to facilitate the following of the pre-computed great circle course.

It should be understood that this instrument as disclosed in this application is especially adapted for use in conjunction with the position finder as defined in my previous Patents #2,064,061 and #2,064,062, which furnishes the computations for a pre-computed great circle course between a point of departure and a point of destination.

In the drawing:

Figure 1 is a front elevation of the vision course and position indicator, certain parts being shown in section;

Figure 2 is a section taken on line 2—2 of Figure 1;

Figure 3 is a fragmentary bottom plan view of the indicator;

Figure 4 is a bottom plan view of the top wall of the indicator showing the light beam design openings;

Figure 5 is a fragmentary bottom plan view showing the micrometer adjustment screw and graduated lower face of the azimuth ring;

Figure 6 is a vertical sectional view of a modified form of the invention illustrating the manner in which the reading of the instrument may be made directly by the eye of the observer;

Figure 7 is a horizontal sectional view taken on line 7—7 of Figure 1;

Figure 8 is a diagrammatic view showing the manner of using a periscope for casting an image of the chart and readings thereof upon a mirror placed within convenient range of the vision of the pilot, the periscope being shown in section;

Figure 9 is a schematic diagram somewhat similar to Figure 8, the periscope being shown in section and adjusted to view the opposite side of the indicator bowl to that as shown in Figure 8;

Figure 10 is a plan view of the permanent chart showing the adjustable and course direction chart and also indicating the timing hand indicating the ground speed;

Figure 11 is a vertical sectional view through a modified type of the instrument showing the telescope used in conjunction with the device when viewing a star or moon for night observation;

Figure 12 is a diagrammatic view illustrating a plane in flight indicating the course with respect to true North and South, and the position of the celestial body being observed.

For the purpose of illustration and explanation the present device has been shown primarily adapted for use upon an airplane or other aircraft. The device, however, is adaptable for use in navigating ships, and other means of transportation, and which may use celestial bodies for observation purposes to determine their position, and such mechanical structural features as may be necessary or adaptable for modification to suit the purpose and the location of installation as may be required. The present illustration, therefore, has been selected merely as an example of the adaptation of the present device to an airplane.

As shown in the drawings, A designates the top of the fuselage of a plane, and the instrument B is preferably suspended below the top of the fuselage A as shown, the instrument B comprising a partly spherical bowl 10 constituting a chart house or housing which is preferably formed of transparent material such for instance as plastic glass or the like, which is at this time commercially placed upon the market by Du Pont, it being preferable that a non-breakable and shatter-proof material be employed. The bowl 10 is also preferably colored or tinted, such as blue, amber, or the like, in order that a design of a light spot cast by a beam of a ray of light from a celestial body may be easily observed through and upon the bowl 10. The bowl 10 is preferably supported upon a suitable standard 11 which may be mounted in any suitable or desired manner and carries a clock movement within a housing 12 which clock movement carries an operating shaft 13 projecting up through a sleeve 13ª which extends through the center point of the spherical or partly spherical bowl, as shown in Figure 2. This operating shaft 13 carries a hand 14 which preferably conforms to the contour of the bowl 10, and as described in the following is adapted to swing within the bowl. The hand 14 is preferably bifurcated, as at 15, for the purpose hereinafter described and constitutes a ground speed gauge. The casing 12 may be suitably braced or connected to the bowl 10 by bracing arms 16.

A chart 17 is permanently formed or positioned upon the inner face of the bowl 10 by either being etched thereon or marked in any suitable or desired manner and the reference lines of the chart 17 may if desired, be formed of luminous paint for facilitating the observation at night. The lines of this chart 17 represent altitude lines, such as the lines 18, and azimuth lines 19 representing both time and azimuth and reference lines 20 (Fig. 10) which are equally spaced from the center throughout their length from the inner edge of the chart 21 to the outer edge 22. These reference lines 20 advise the pilot as to the instantaneous position of his plane in reference to the vertical and horizontal, enabling the pilot to ascertain whether or not the plane is stabilized or is pitched at an angle in any direction, and are arranged in cross relation, as shown in Figure 10.

The course direction chart 23, which is removable and adjustable, is carried within the bowl 10 upon a suitable support 24 which fits over the sleeve 13ª and clamps the course direction chart 23 in place, and this course direction chart 23 is also preferably formed of transparent material and comprises a segmental strip and conforms to the exact spherical shape of the bowl 10. The course direction chart may be rotated around the sleeve 13ª to change the position for time of departure. This course direction chart may be manually adjusted as to time or may be removed and a new chart substituted depending upon the time of departure and the ground speed to be maintained during the flight and the course direction chart 23 may be firmly held in position by means of an adjusting screw 25 (Fig. 7) carried by the bowl 10 and passing through the arc-shaped slot 26 of the segment 27 which projects preferably to one side of the support 24, as shown in Figure 7. Attention is invited to Figure 7 which shows the manner in which the course direction chart may be angularly changed to suit the geographic location, time of departure and ground speed of the flight. This chart 23 has the course thereof plotted indicated by the two arc lines 28 and 29 which are equally spaced and drawn on the arc of a circle to designate a pre-computed great circle course of travel for a given flight and ground speed between the point of departure and the point of destination. All celestial bodies describe an arc in the heavens, for instance at 8 A. M., May 1, 1937, the sun is at a definite place in the heavens and at 10 A. M., it has moved higher and toward the South. If a pre-computed curve of the sun is drawn on a spherical piece of paper such for instance as the chart sheet 23, and this chart sheet 23 is placed upon the chart 17, and if the instrument or bowl is pointed true North and level, the sun will shine through the opening 32 and cast a sun spot on the pre-computed curve of the chart 23 for the entire two hour period. It should be understood that the chart 17 shows the geographic locations of two known terminals and the second chart 23 contains a pre-computed great circle course of travel between these two known terminals. The chart 23 is placed upon the corresponding chart 17 so as to have the terminals upon the chart 23 register with the known terminals on the chart 17. The lines 28 and 29 are numbered consecutively from left to right depending upon the distance to be traveled, for example, from 1 to 23 as shown. The upper line 29 is numbered, as shown for example, from 2 to 24, the upper numbers and marking being offset to the right with respect to the numbers on the lower line so that the numbers may alternate on the respective lines 28 and 29, every-other number being used in the upper and lower lines and all of the numbers and markings being equally spaced, which numbers may represent towns, rivers, mountains, or other known locations over which the pilot will be flying at a given time, and these numbers may be correspondingly marked by the pilot upon his own chart 23 to represent certain geographic locations to correspond with the same locations on the chart 17.

The bowl 10 is suspended from the top plate 30 which may be secured in any suitable or desired manner to the under face of the top of the fuselage A. An enlarged opening 31 (Fig. 2) is formed in the top 30 and above this opening in the top of the fuselage A is formed a light ray entrance opening or series of openings 32 preferably arranged in a suitable design which may be varied or selected as to design or color to suit the desired display of the light design of the beam of light upon the bowl 10. The top 30 carries an azimuth ring and scale 33 from zero to 360 degrees, which is provided with teeth 34 upon its periphery meshing with a micrometer adjusting screw 35 of suitable design whereby the entire bowl 10 may be completely rotated if desired, so that the light beam such as is indicated by the angular dotted line in Figure 2 may be caused to shine upon the course direction chart, the bowl being adjustable to a proper position depending upon the direction of flight with respect to the celestial body the light beam of which is being used for the purpose of ascertaining the position. For instance, while the plane is travelling in one direction, the bowl will be positioned as illustrated in Figure 8 and upon the return flight where the heavenly or celestial body is in a different position the bowl will be adjusted such as is illustrated in detail in Figure 9, the bowl being adjustable necessarily so that zero will always appear true North with respect to the course.

By considering Figure 2, in conjunction with Figures 8 and 9, the manner in which a celestial body is used as a steering medium or guide should be obvious. The light from the sun, for instance, as shown in Figures 8 and 9, and also in Figure 2, will pass down through the opening 32 and the special design of the opening will cast an image upon the chart 17 which is transparent, and the course direction chart 23 and through the bifurcated portion 15 of the hand 14 allowing an observer to observe the location of this design upon the permanent chart 17 and the course direction chart 23. In other words, the object of the pilot is to have the light from the celestial body such as the sun pass through the aperture or opening 32 which is specially designed and also to coincide with the bifurcated portion 15 of the hand 14 and extend between the lines 28 and 29 of the chart 23 and also be displayed upon the transparent permanent chart 17. In this way, the pilot by this observation will know that he is on his course and on time, and may determine his exact location at that particular time provided the plane is in a true horizontal position. A type of tilt indicator is used in conjunction with this instrument, as will be hereinafter described to advise the pilot as to whether or not the plane has been purposely tilted in order to have the light beam in registration as described. The bowl 10 is preferably provided upon one side with a door 36 which may be provided with a light dimming or shielding panel 37 which is hinged, as at 38, so that the door may be opened to permit access to the interior of the bowl 10 and allow the course direction chart 23 to be adjusted, removed, or replaced. Suitable means may be provided for changing the rate of speed of the hand through suitable conventional mechanism for varying the speed of the clockwork such as is commonly used in devices of this character, and such a means is indicated generally by the numeral 39. The speed of the hand should be changed to conform to the speed which is to be maintained by the pilot during the flight for which the course direction chart has been plotted, and this hand constitutes a ground speed gauge.

The clockwork 12 may be adjusted in accordance with sidereal time to compensate for the earth's rotation and it should be understood that all clockwork mechanisms which use main springs have regulators for increasing or decreasing the speed of the hand of the clock. The hand may travel at a rate of speed (along the precomputed sun curve) in the exact relationship with respect to the sun while traveling over the course the plane is flying. For example, if the sun curve between Washington and New York is two inches long on the chart 23 and the speed of the plane is such that it will take two hours to travel from Washington to New York, the hand 14 must take two hours to move two inches over the sun curve drawn on the chart. In view of the notoriously old, well-recognized and universally used clock mechanism and mechanism for speeding up or reducing the speed of the regulator of all clocks using a main spring, it is thought unnecessary to include in the present description further reference to this structure. Should it be desired, a speed changing device such as is shown in the patent to P. Van H. Weems, #2,008,734, issued July 23, 1935, may be used.

In Figure 6, there is shown a modified form of the device for direct observation which is of the same general structure shown in Figure 2, and is adapted for use where direct observation may be made without the necessity of a periscope shown in Figures 1 to 3, and in Figures 8 and 9.

In Figure 11 in addition to the structure of the instrument previously described, I employ a telescope 40 for the purpose of observing the moon and stars at night, the telescope 40 having a wide angle lens and being hingedly supported, as at 41, upon a standard 42, and braced by an adjustable brace 43 at its lower end whereby the angle of the telescope 40 may be adjusted periodically and when occasion should arise to properly focus the beam of light from the observed celestial body upon the charts in the manner as shown in Figure 11.

It is necessary in some instances to place the instrument, and in fact the bowl 10, in a position where the readings on the charts may not be directly observed and in this instance, I provide a periscope 44 of any suitable or desired type which may be supported in any suitable or desired manner such for instance as by means of a clamp 45 upon the hanger standard 11 depending from the bowl 10 and clock casing 12. This periscope 44 may preferably be provided with a focusing lens section 44' at its outer end for focusing the reading of the charts upon the vision mirror 65 which is preferably located in front of the pilot on the front of the steering wheel 47. The periscope 44 is preferably adjustable and carries an adjustable and rotatable upright 48 which is also removable and in which is mounted a pair of reflecting prisms 49 and 50, as shown in Figure 8. The periscope 44 is also provided with an extension 51 at its outer end so that the upright removable section 48 may be replaced to observe the opposite side of the bowl 10 and the readings of the chart when the beam of light from the observed celestial body extends in the angular position such as shown in Figure 9.

It is not desired to limit this invention to any particular type of periscope and the present illustration is one only of a typical character, the passage of the reflection of the image being indicated by the dotted lines in the diagrammatic views 8 and 9, the image being adapted to be reflected upon the observation or vision mirror 65 whereby the pilot may observe the proper readings of the chart 17, the course direction chart 23, and the hand 14.

The instrument illustrated and described may be made of sufficient size because of the structural features to magnify the graduated readings on the various scales and charts since these charts and scales on the instrument may be made sufficiently large to enable the pilot to easily and quickly visualize the amount of deviation before going off his course to too great an extent. It is a well-known fact that all instruments used up to the present time are provided with scales and charts of such a miniature nature that a pilot may be a considerable distance before he even notices the fact that he is off his course. By means of the present instrument and checking device, the pilot may more easily and more quickly correct his position to maintain substantially the plotted course.

It should be noted that the chart shown in Figure 10 illustrates the permanent or stationary chart 17 within the bowl 10 and the course direction chart 23 fits upon the chart 17 closely, the outer edge being concentric with the conformation of the bowl 10, as shown in Figure 10 and also in Figure 7.

In considering Figures 8 and 9 also, it should be borne in mind that these figures will only illustrate a schematic diagram in each instance, the mirror 46 being turned for the purpose of illustration at right angles to its normal position.

By means of the present instrument illustrated particularly in Figures 1 to 3 inclusive, a pilot will be enabled to follow a straight line or course by keeping the light spot in its proper place upon the chart and maintaining the plane level so that if desired an aerial photograph may be taken of a predetermined strip of territory during the flight and by consulting the leveling device and the visible course position indicator his angular position may be determined and proper correction made whereby an aerial photograph may be taken directly above the desired geographic location.

If desired, a photographic chart comprising a sheet having chart lines indicated thereon and designated by the numeral 11ᵃ may be placed within the bowl whereby a ray of light from a selected celestial body may be recorded thereon for indicating the angular position of the plane at any time during its course of flight with respect to the selected celestial body. This will furnish a permanent recorded flight record.

Having described the invention, what I claim as new is:

1. A visible course and position indicator for ships, aeroplanes and other means of transportation comprising a container substantially hemispherical in shape and containing a plotted chart showing the geographic locations of two known terminals, a second removable chart containing a pre-computed great circle course of travel between said terminals and fitted against said first mentioned chart and adjustable to indicate the great circle course between said terminals, and means carried by said container in a position for directing a spot of light from a selected celestial body upon said charts whereby a pilot may accurately follow a pre-computed great circle course at predetermined ground speed by keeping the spot of light from a selected celestial body at all times upon the pre-computed great circle course upon the second chart when the means of transportation is level and has not drifted by the wind.

2. A visible course and position indicator of the class described comprising a chart, a second removable and adjustable chart placed against the first mentioned chart showing the geographic locations of two known terminals, the second chart containing an indication of a pre-computed great circle course of travel between said terminals, a timing hand adapted to swing over the pre-computed great circle course, means for moving said hand in timed relation with respect to a selected speed, and means for directing a spot of light from a selected celestial body upon said charts and hand whereby a pilot may facilitate the following of a pre-computed great circle course at predetermined ground speed by maintaining the spot of light from a selected celestial body constantly upon the pre-computed great circle course on the second chart and in registration with the hand.

3. A visible course and position indicator of the class described comprising a chart showing the geographic locations of two known terminals, a second removable and adjustable chart placed against the first mentioned chart, the second chart containing an indication of a pre-computed great circle course of travel between said terminals, a timing hand adapted to swing over the pre-computed great circle course, means for moving said hand in timed relation with respect to a selected speed, means for directing a spot of light from a selected celestial body upon said charts and hand whereby a pilot may facilitate the following of a pre-computed great circle course at predetermined ground speed by maintaining the spot of light from a selected celestial body constantly upon the pre-computed great circle course on the second chart and in registration with the hand, and means for selectively changing the speed of the hand to conform with a selected speed of the means of transportation upon which the indicator may be mounted.

4. A visible course and position indicator of the class described comprising a container, a chart carried by said container and showing the geographic locations of two known terminals, a second removable and adjustable chart placed against the first mentioned chart, the second chart containing an indication of a pre-computed great circle course of travel between said terminals, a timing hand adapted to swing over the pre-computed great circle course, means for moving said hand in timed relation with respect to a selected speed, means for directing a spot of light from a selected celestial body upon said charts and hand whereby a pilot may facilitate the following of a pre-computed great circle course at predetermined ground speed by maintaining the spot of light from a selected celestial body constantly upon the pre-computed great circle course on the second chart and in registration with the hand, means for selectively changing the speed of the hand to conform with a selected speed of the means of transportation upon which the indicator may be mounted and in accordance with sidereal time, and said container being formed of transparent material for permitting a spot of light from a selected celestial body to be observed by a pilot.

5. A visible course and position indicator of the class described comprising a chart showing the geographic locations of two known terminals, a second removable and adjustable chart placed against the first mentioned chart, the second chart containing an indication of a pre-computed great circle course of travel between said terminals, a timing hand adapted to swing over the pre-computed great circle course, means for moving said hand in timed relation with respect to a selected speed, means for directing a spot of light from a selected celestial body upon said charts and hand whereby a pilot may facilitate the following of a pre-computed great circle course by maintaining the spot of light from a selected celestial body constantly upon the pre-computed great circle course on the second chart and in registration with the hand at predetermined ground speed, means for selectively changing the speed of the hand to conform with a selected speed of the means of transportation upon which the indicator may be mounted and in accordance with sidereal time to compensate for the earth's rotation, said container being formed of transparent material for permitting a spot of light from a selected celestial body to be observed by a pilot, and reflecting means for reflecting the image of a spot of light from a selected celestial body, and said charts and hand to be conveniently viewed by a pilot from a pilot's seat.

6. A visible course and position indicator of the class described comprising a chart showing the geographic locations of two known terminals, a second removable and adjustable chart placed against the first mentioned chart, the second chart containing an indication of a pre-computed great circle course of travel between said terminals, a timing hand adapted to swing over the pre-computed great circle course, clockwork for moving said hand in timed relation with respect to a selected speed, means for directing a spot of light from a selected celestial body upon said charts and hand whereby a pilot may facilitate the following of a pre-computed great circle course at predetermined ground speed by maintaining the spot of light from a selected celestial body constantly upon the pre-computed great circle course on the second chart and in registration with the hand, said hand being slotted and the hand being movable over the second chart in a manner to cause the slotted portion to intersect the pre-computed course upon the second chart whereby a pilot may cause a spot of light from a selected celestial body to register with the course indication within the slotted portion of the hand, the first chart, and the pre-computed course upon the second chart.

7. A visible course and position indicator of the class described comprising a chart showing the geographic locations of two known terminals, a second removable and adjustable chart placed against the first mentioned chart, the second chart containing an indication of a pre-computed great circle course of travel between said terminals, a timing hand adapted to swing over the pre-computed great circle course, clockwork for moving said hand in timed relation with respect to a selected speed, means for directing a spot of light from a selected celestial body upon said charts and hand whereby a pilot may facilitate the following of a pre-computed great circle course at a predetermined ground speed by maintaining the spot of light from a selected celestial body constantly upon the pre-computed great circle course on the second chart and in registration with the hand, and a telescopic means cooperating with the means for directing a spot of light from a selected celestial body upon said charts whereby celestial bodies such as the stars, the moon, and the like, may be magnified for observance at night.

8. A visible course and position indicator of the class described comprising a container, a chart carried by the container and showing the geographic locations of two known terminals, a second removable and adjustable chart placed against the first mentioned chart, the second chart containing an indication of a pre-computed great circle course of travel between said terminals, a timing hand adapted to swing over the pre-computed great circle course, means for moving said hand in timed relation with respect to a selected speed, means for directing a spot of light from a selected celestial body upon said charts and hand whereby a pilot may facilitate the following of a pre-computed great circle course between said terminals by maintaining the spot of light from a selected celestial body constantly upon the pre-computed great circle course on the second chart and in registration with the hand, means for selectively changing the speed of the hand to conform with a selected speed of the means of transportation upon which the indicator may be mounted, said container being formed of transparent material for permitting a spot of light from a selected celestial body to be observed by a pilot, and periscopic reflecting means for reflecting the image of a spot of light from a selected celestial body, and said charts and hand to be conveniently viewed by a pilot from a pilot's seat.

9. A course and position indicator for aircraft and other navigable crafts comprising a chart showing the geographic locations of at least two terminals between which it is desired to fly, a second chart bearing a pre-computed great circle course indication for a given period of time, said second chart being positionable over said first chart to cause the ends of said indication to coincide with said terminals, and timing means including a part movable over and along said indication to locate an instantaneous indication of position whereby when a ray from a known celestial body impinges upon said instantaneous indication the aircraft is known to be properly traversing the desired course.

10. A course and position indicator of the class described comprising a transparent chart showing the geographic locations of at least two terminals between which it is desired to travel, a second transparent chart bearing a pre-computed great circle course indication for a given period of time, said charts being positionable in superimposed relation to cause the ends of the said indication to coincide with said course terminals, timing means movable in timed relation along said indication to locate an instantaneous indication of position whereby when a ray of light from a known celestial body impinges upon said instantaneous indication of position an aircraft and the like is known to be properly traversing the desired course, and means located above the charts carrying a designed symbol adapted to intersect a ray of light from a known celestial body for causing a designed spot of light of a desired conformation to impinge upon said instantaneous indication.

11. In combination with a support, an observation instrument carried by the support, the support having a view opening formed therein through which an image of an object, light spot and the like may be cast upon said observation instrument, said observation instrument having azimuth and altitude indicating means upon which said image, light spot and the like, may be cast, a pre-computed great circle course indication for a given period of time associated with said azimuth and altitude indicating means, and timing means movable in timed relation along said indication to locate an instantaneous indication of position whereby when an image of an object, light spot and the like impinges upon said instantaneous indication the altitude and azimuth of the observed image, light spot and the like, may be ascertained.

FREDERICK HAYES HAGNER.